Nov. 25, 1947.   T. R. WILEY   2,431,530
POTATO MOLD
Filed Dec. 7, 1945   3 Sheets-Sheet 1
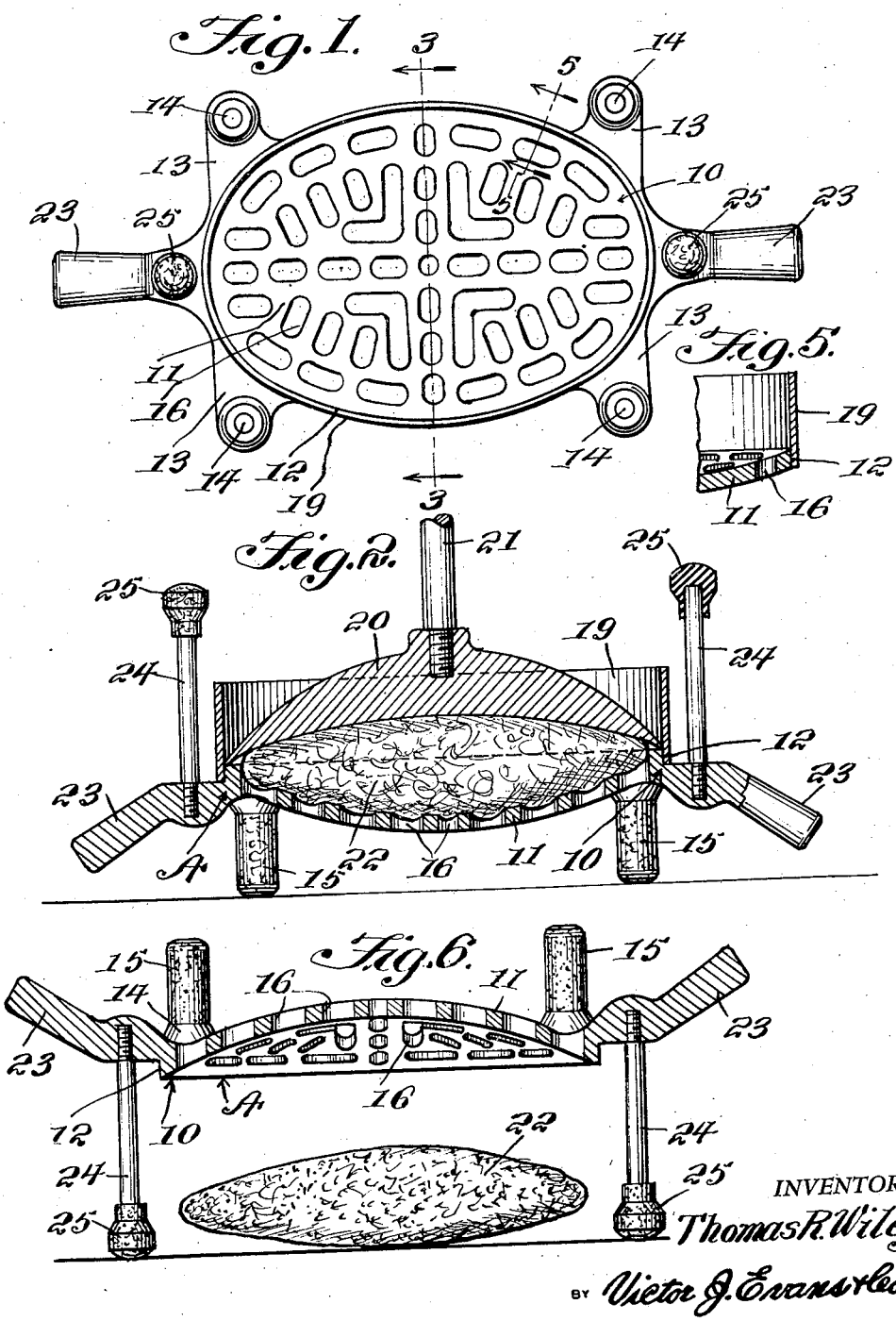
INVENTOR.
Thomas R. Wiley,
BY Victor J. Evans & Co.
ATTORNEYS.

Nov. 25, 1947.   T. R. WILEY   2,431,530
POTATO MOLD
Filed Dec. 7, 1945   3 Sheets-Sheet 2
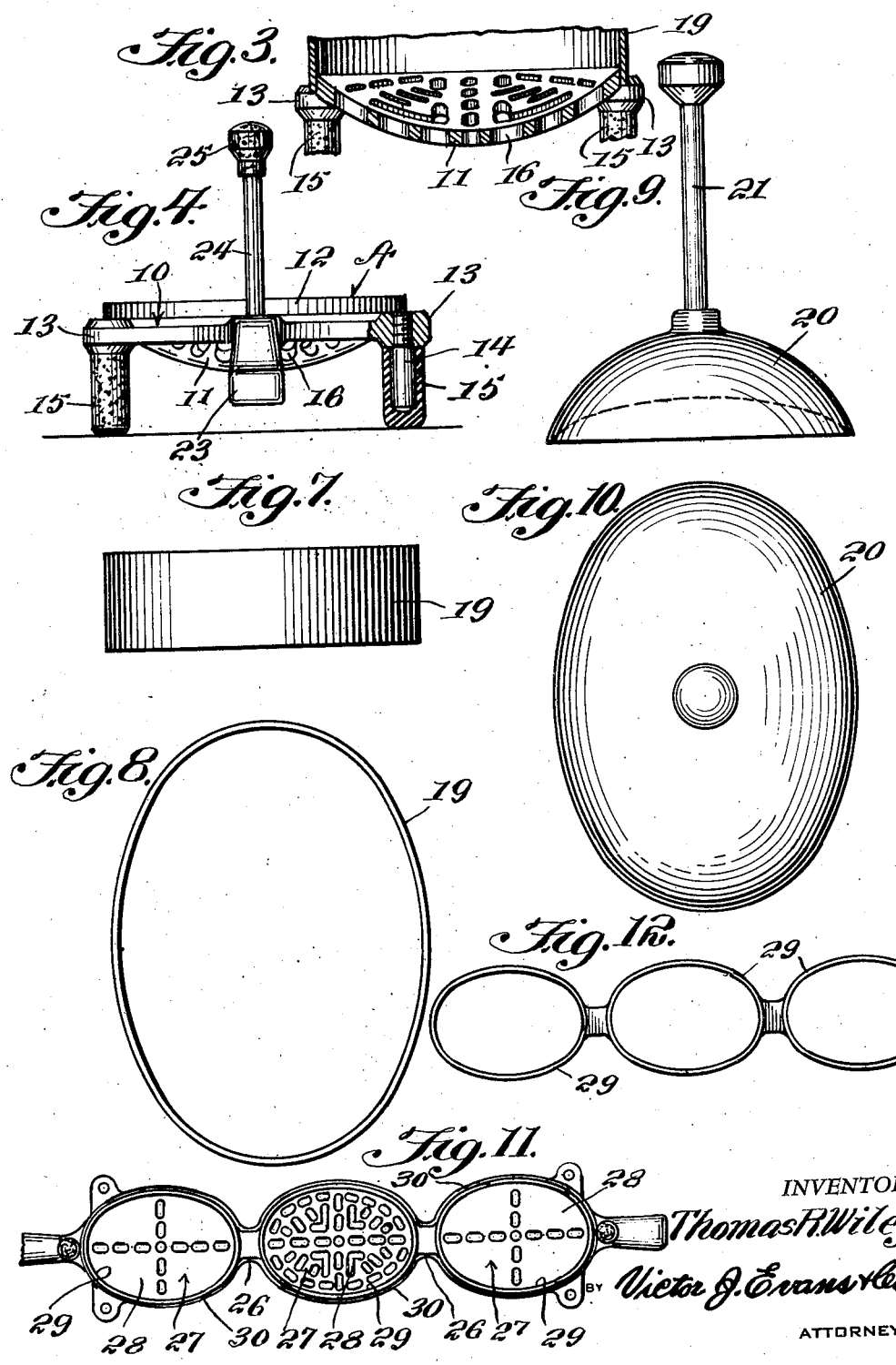

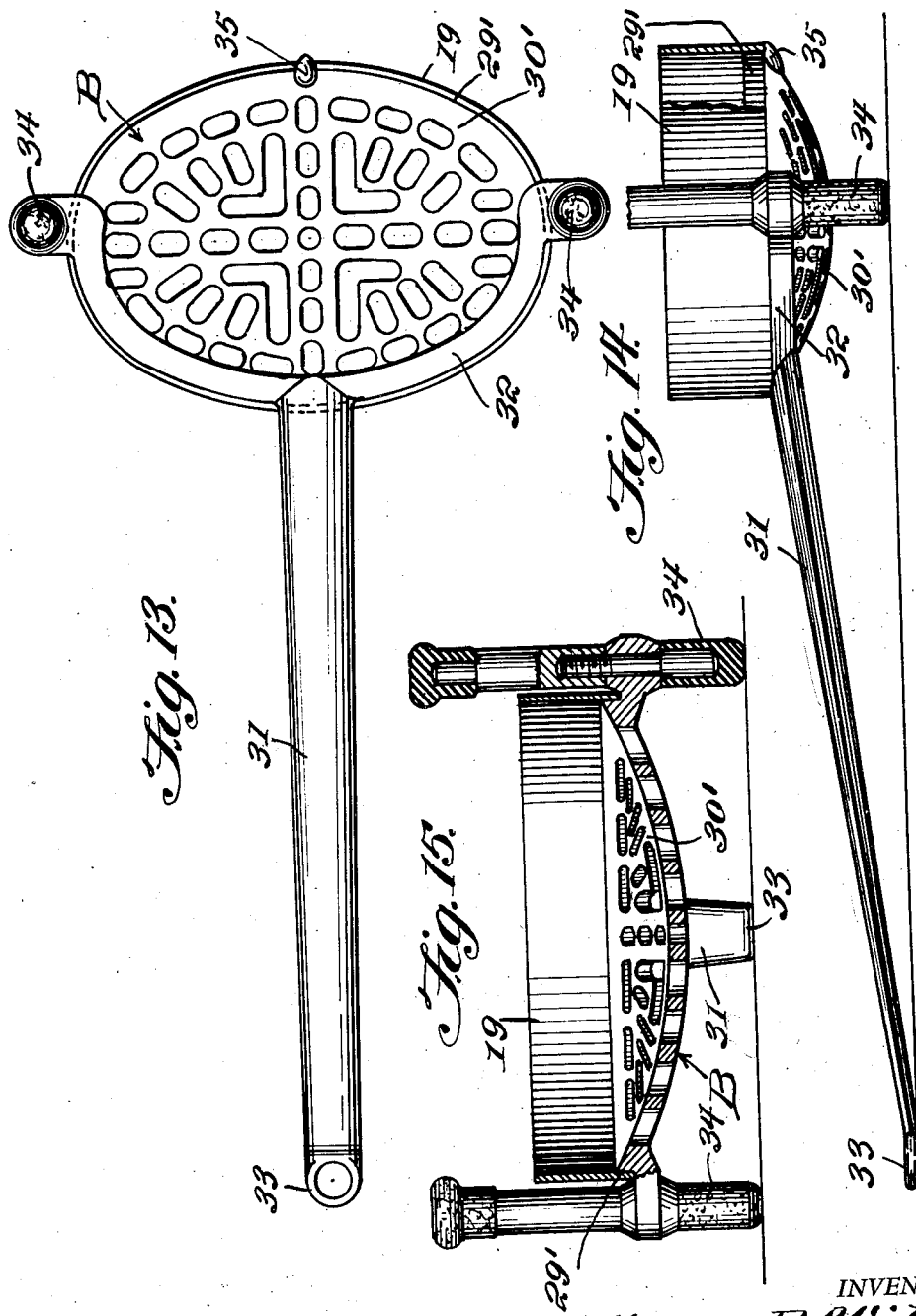

Patented Nov. 25, 1947

2,431,530

UNITED STATES PATENT OFFICE 2,431,530

POTATO MOLD

Thomas Rice Wiley, Sarona, Wis.

Application December 7, 1945, Serial No. 633,482

3 Claims. (Cl. 107—19)

1

The invention relates to a vegetable molding machine, and more especially to a mashed potato molding device.

The primary object of the invention is the provision of a device of this character, wherein mashed vegetables, more especially potatoes, can be molded into a determined shape to form a cake for service in this manner, the device being of novel construction, so that the mashings will not stick when the molded mass is being dispensed therefrom.

Another object of the invention is the provision of a device of this character, wherein the mass of potatoes or other vegetables in a soft condition can be readily and easily handled for the molding thereof in a definite cake form through molding in the use of such device.

A further object of the invention is the provision of a device of this character, wherein chopped and plastic food stuffs, such as meat, codfish, vegetables or the like can be shaped into cake form, and the latter dispensed from the said device with ease and dispatch without sticking or breaking up.

A still further object of the invention is the provision of a device of this character, which is simple in construction, thoroughly reliable and efficient in operation, strong, durable, readily and easily handled with dispatch, possessed of few parts, sanitary, conveniently cleaned after use, and inexpensive to manufacture.

With these and other objects in view the invention consists in the features of construction, combination and arrangement of parts as will be hereinafter more fully described, illustrated in the accompanying drawings, which disclose the preferred and modified forms of construction of the invention, and pointed out in the claims hereunto appended.

In the accompanying drawings—

Figure 1 is a top plan view of the device constructed in accordance with the invention and with the plunger deleted.

Figure 2 is a vertical central longitudinal sectional view therethrough with the plunger in association therewith.

Figure 3 is a sectional view taken on the line 3—3 of Figure 1, looking in the direction of the arrows.

Figure 4 is an end elevation of the device as shown in Figure 1.

Figure 5 is a fragmentary detail sectional view taken on the line 5—5 of Figure 1, looking in the direction of the arrows.

Figure 6 is a view similar to Figure 2 showing

2 the plunger removed and the device inverted for dispensing the molded product therefrom.

Figure 7 is a side view of the retaining ring or hoop detached from the device.

Figure 8 is a top plan view thereof.

Figure 9 is a side view of the plunger.

Figure 10 is a top plan view thereof.

Figure 11 is a top plan view of a modified form of the device.

Figure 12 is a plan view of the retaining ring or hoop for use with the form of the device shown in Figure 11.

Figure 13 is a bottom plan view of another modification of the device.

Figure 14 is a side view, partly broken away, thereof.

Figure 15 is a vertical central cross-sectional view of the same.

Similar reference characters indicate corresponding parts throughout the several views in the drawings.

Referring to the drawings in detail, particularly Figures 1 to 10, inclusive, the molding device constituting the present invention, in its preferred form of construction, comprises a base or bottom mold unit denoted generally at A, which is invertable and involves a main body 10 having a spoon shaped bowl 11 provided with a rim 12 which borders the latter. This rim 12 at opposite ends thereof has integral therewith opposed laterally extended ears 13 in which are detachably fitted rest legs 14 carrying resilient foot pads 15, and such legs 14 through contact of the pads 15 with a foundation support the body 10 elevated and in upright position thereon, as is clearly shown in Figures 2, 3 and 4 of the drawings, which is the normal position in the use of the device.

The body 10, which is of concave-convex formation, is provided with a reticular area to effect a grating 16 creating air vents to the hollow in such body, and also to permit excess stuffs to discharge therefrom during the molding operation of the device.

A detachable retaining ring or hoop 19, is telescopically fitted peripherically over the rim 12 when the device is in upright position for receiving a plastic mass of food stuff to be molded into cake form by the body through the use of a plunger having a packing head 20 and an operating stick or staff 21 respectively. The plunger having the head 20 and stick or staff 21 is shown in working position in Figure 2 of the drawings for the molding of the stuff 22 into cake formation.

The opposite ends of the body 10 have formed therewith specially constructed hand-holds or handles 23, so that this body can be inverted to the position shown in Figure 6 of the drawings, after the stuff has been molded into cake form and to be dispensed, as disclosed in this figure of the said drawings.

Fitted in the junctures of the handles or handholds 23 with the rim 12 of the body 10 are bumper stems or shanks 24 of resilient bumpers 25, so that when the body 10 is inverted the contents of the latter can be shaken therefrom through hammering contact of the resilient bumpers 25 with a foundation, and in this way the formed cake will be delivered or discharged with ease and dispatch without breaking and the sticking of such cake to the said body during the dispensing operation.

In Figures 11 and 12 of the drawings there is shown a modification of the invention, wherein there is interconnected at 26 a plurality of base or bottom mold units 27, each having the spoon shaped bowls 28, and for association with the latter is the interconnected series of retaining rings or hoops 29, which in the group form detachably fit the rims 30 of the respective units 27 for the cupping of food stuff within the bowls 28, there being a single plunger used with this modified form of the device, and such plunger is alike to the plunger having the head 20 and stick or staff 21 respectively.

In Figures 13 to 15, inclusive of the drawings, there is shown a further modification of the device, wherein the base or bottom unit B which is single in form has attached to the rim 29' of the bowl 30' thereof, an elongated yoke handle 31, the yoke end 32 being unitary with the rim 29' while the opposite end 33 of this handle constitutes a rest foot cooperating with the rest legs 34 for holding in a normal upright position the base or bottom unit B. Diametrically opposed to the medial portion of the yoke end 32 and formed on the rim on the undersurface of the bowl 30' is the lug 35 and the ring 19 rests on the lug 35 and the yoke end 32.

In the use of the device the base or bottom unit is disposed in its normal upright position, with the ring or hoop attached, and the bowl is filled with loose food stuff to be molded therein through the service of the plunger to compact the stuff into cake form, any surplus stuff being forced through the interstices of the said bowl, and thereafter the unit is inverted for the dispensing of the cake form from such unit, this being clearly shown in Figure 6 of the drawings, while the formation of the cake has showing in Figure 2.

It is believed that the operation of the device will be apparent to those skilled in the art and it is to be understood that changes in the details of construction, arrangement and combinations of parts may be resorted to without departing from the spirit of the invention and the scope of the appended claims.

What is claimed is:

1. A device of the kind described, comprising a base molding unit having a reticulated bowl center, supporting legs on the unit, a retaining ring detachably engageable with the unit, a packing plunger for cooperation with the bowl center, and bumpers carried by the unit and operative on the inverting of such unit.

2. A device of the kind described, comprising a base molding unit having a reticulated bowl center, supporting legs on the unit, a retaining ring detachably engageable with the unit, a packing plunger for cooperation with the bowl center, bumpers carried by the unit and operative on the inverting of such unit, and means on the unit for manual handling thereof.

3. A device of the kind described, comprising a base molding unit having a reticulated bowl center, supporting legs on the unit, a retaining ring detachably engageable with the unit, a packing plunger for cooperation with the bowl center, bumpers carried by the unit and operative on the inverting of such unit, means on the unit for manual handling thereof, and means forming a part of the plunger for the manual operation thereof.

THOMAS RICE WILEY.

REFERENCES CITED

The following references are of record in the file of this patent:

UNITED STATES PATENTS

| Number | Name | Date |
|---|---|---|
| 986,127 | Beaulieu et al. | Mar. 7, 1911 |
| 996,449 | Bodenstein | June 27, 1911 |
| 1,530,189 | Miller et al. | Mar. 17, 1925 |